Figures 1, 2:
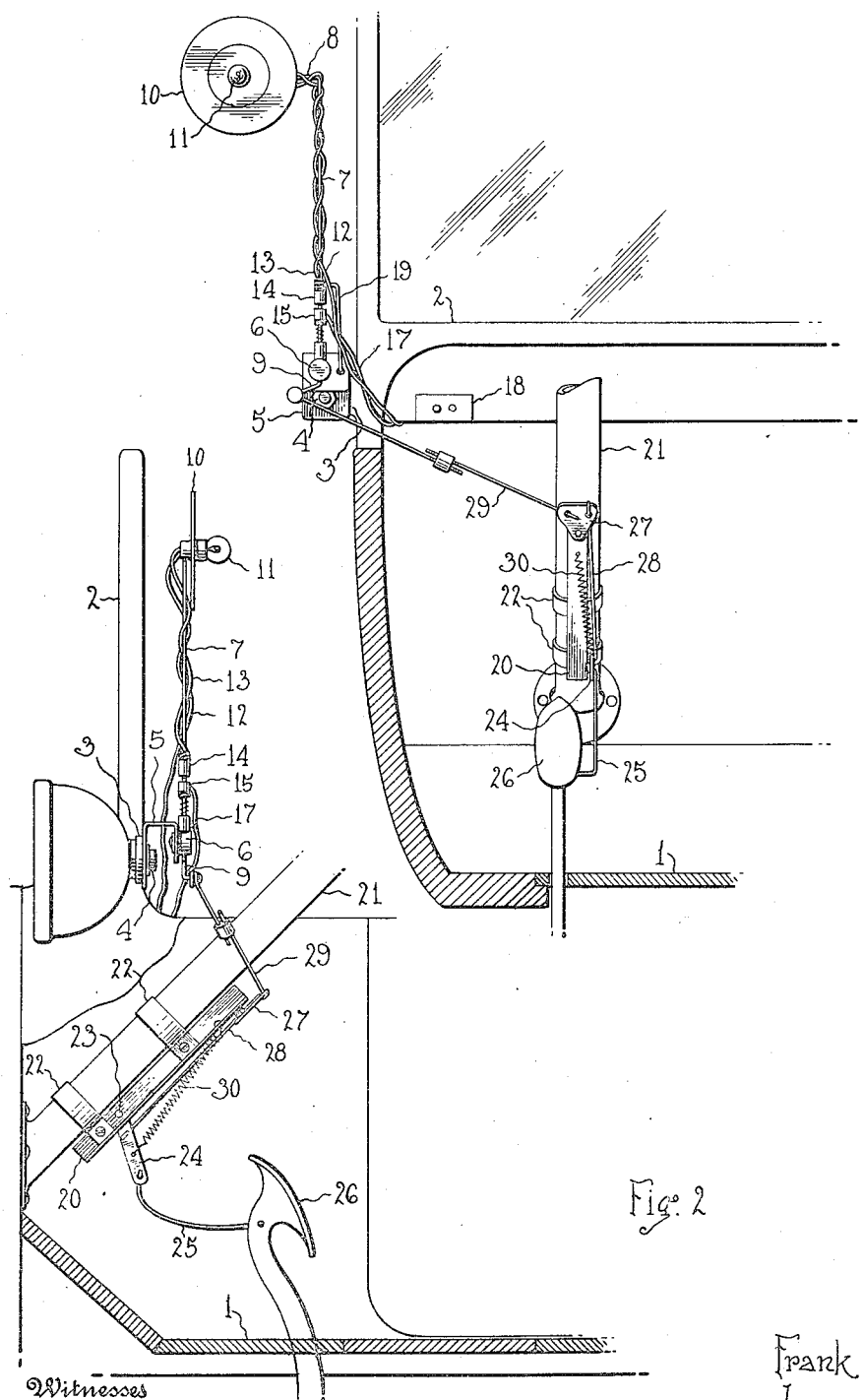

F. E. MORS & J. A. BURT.
TRAFFIC SIGNAL.
APPLICATION FILED OCT. 18, 1917.

1,281,630.

Patented Oct. 15, 1918.

Witnesses
Arthur F. Draper
Karl H. Butler

Inventors
Frank E. Mors
James A. Burt
By
Attorneys

UNITED STATES PATENT OFFICE.

FRANK E. MORS AND JAMES A. BURT, OF DETROIT, MICHIGAN.

TRAFFIC-SIGNAL.

1,281,630.  Specification of Letters Patent.  Patented Oct. 15, 1918.

Application filed October 18, 1917. Serial No. 197,241.

*To all whom it may concern:*

Be it known that we, FRANK E. MORS and JAMES A. BURT, citizens of the United States of America, residing at Detroit, in the county of Wayne and State of Michigan, have invented certain new and useful Improvements in Traffic-Signals, of which the following is a specification, reference being had therein to the accompanying drawings.

This invention relates to a traffic signal and has special reference to that class including semaphore arms that are automatically actuated by a control lever or pedal of a vehicle, particularly of an automobile.

The primary object of our invention is to provide a traffic signal in the above class that may be easily and quickly installed in connection with the steering post or column and a lamp bracket of an automobile with attachment to the clutch or brake pedal of the automobile, so that when the automobile is about to stop or slow up, the signal will be displayed to indicate to the operator of a following automobile that the signal carrying automobile is about to stop or turn into another lane of travel.

Another object of our invention is to provide a semaphore signal that may be automatically illuminated, at night, and at each actuation of the signal.

A further object of our invention is to devise a semaphore signal consisting of comparatively few parts that are inexpensive to manufacture and highly efficient for the purposes for which they are intended.

The above and other objects are attained by a mechanical construction that will be hereinafter specifically described and then claimed and reference will now be had to the drawing, wherein Figure 1 is an elevation of the signal in connection with a portion of an automobile, and Fig. 2 is a side elevation of the same.

In the drawing, 1 denotes a portion of an automobile body having a windshield 2 and a lamp bracket 3. Attached to the lamp bracket 3 by the lamp fastening means 4 is a signal bracket 5 and pivotally connected to the signal bracket, as at 6, is an arm 7. The arm 7 is maintained normally in parallelism with the side edge of the windshield and has the upper and lower ends bent outwardly as at 8 and 9. The upper bent end of the arm supports a reflector 10 and an incandescent lamp 11, the lamp being concentric of the reflector and having conductors 12 and 13 twisted about the arm 7. The conductor 13 is connected to a contact member 14 slidable on the arm 7 in proximity to a contact member 15 on said arm and yieldably held by a small spring 16 encircling the arm. Both of these contact members are insulated from the arm 7, and the contact member 15 has a conductor 17, which with the conductor 12 extend to a suitable switch 18 and a suitable source of electrical energy, as batteries (not shown). The contact member 14 is connected to and insulated from a link 19 pivotally connected to the contact member and also to the bracket 5, so that when the arm 7 is swung outwardly the contact member 14 will be brought into engagement with the contact member 15 and thereby establish an electric circuit, providing the switch 18 is closed, that will illuminate the lamp 11.

The mechanism for actuating the arm 7 includes an angle plate 20 attached to the lower portion of a steering column or post 21 by clamps 22 or other fastening means. The angle bar 20 is disposed in parallelism with the steering post 21 and pivotally connected to one of the flanges of the bar as at 23, is a lever 24, and the outer end of said lever is connected by a link 25 to a clutch or brake pedal 26 of the automobile. On another flange of the bar 20 and at the upper end thereof is a pivoted bell crank or triangular shaped member 27 connected by a link 28 to the lever 24 and by an extensible link 29 to the lower angular end 9 of the arm 7.

A coiled retractile spring 30 connects the lever 24 with the upper end of the bar 20 and the tractile force of the spring will maintain the arm 7 normally vertical, as shown in Fig. 1.

When the pedal 26 is depressed, the lever 24 is shifted and through the medium of links 28 and 29, bell crank 27, the arm 7 is swung on the pivot 6 to a horizontal position, thus placing the lamp 11 and the reflector 10 in a position that it may be readily observed by the occupants of a following automobile. When the pedal 26 is released, the spring 30 restores the arm 7 to a vertical position.

During the day, the switch 18 is open, but at night, said switch is closed, so that the movable contact members 14 and 15 may automatically establish an electric circuit through the lamp 11 at each actuation of the signal.

It is thought that the operation and utility of our invention will be apparent without further description, and while in the drawing there is illustrated a preferred embodiment of our invention, it is to be understood that the structural elements are susceptible to such variations and modifications as fall within the scope of the appended claim.

What we claim is:—

The combination with a lamp bracket, a steering post and a pedal, of a signal arm pivotally supported from the lamp bracket, an angle bar having a flange thereof connected to the steering post, a lever pivotally connected to the flange of said bar and to said pedal and adapted to be moved thereby, a bell crank carried by the other flange of said bar, links connected to said bell crank and to said lever and said arm and adapted to move said arm when said pedal is actuated, and means connecting said lever and said bar adapted to maintain said arm in a vertical position.

In testimony whereof we affix our signatures in presence of two witnesses.

FRANK E. MORS.
JAMES A. BURT.

Witnesses:
KARL H. BUTLER,
ANNA M. DORR.

Copies of this patent may be obtained for five cents each, by addressing the "Commissioner of Patents, Washington, D. C."